US009485343B2

(12) United States Patent
Gray (10) Patent No.: US 9,485,343 B2
(45) Date of Patent: *Nov. 1, 2016

(54) SYSTEM AND METHOD TO SORT MESSAGES EXCHANGED IN A WIRELESS PERSONAL AREA NETWORK ACCORDING TO RELATIVE ORIENTATIONS AND POSITIONS OF SENDING AND RECEIVING DEVICES

(71) Applicant: Zoku, Inc., Sausalito, CA (US)

(72) Inventor: Scott Mills Gray, Sausalito, CA (US)

(73) Assignee: ZOKU, INC., Sausalito, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/854,457

(22) Filed: Sep. 15, 2015

(65) Prior Publication Data

US 2016/0006852 A1    Jan. 7, 2016

Related U.S. Application Data

(63) Continuation of application No. 14/093,992, filed on Dec. 2, 2013, now Pat. No. 9,154,604.

(60) Provisional application No. 61/732,297, filed on Dec. 1, 2012.

(51) Int. Cl.
| | | |
|---|---|---|
| *H04M 1/725* | (2006.01) | |
| *H04W 76/02* | (2009.01) | |
| *H04L 29/08* | (2006.01) | |
| *H04W 4/00* | (2009.01) | |
| *H04W 8/00* | (2009.01) | |
| *H04W 64/00* | (2009.01) | |
| *H04W 4/02* | (2009.01) | |

(52) U.S. Cl.
CPC .......... *H04M 1/7253* (2013.01); *H04L 67/104* (2013.01); *H04W 4/008* (2013.01); *H04W 4/026* (2013.01); *H04W 4/027* (2013.01); *H04W 8/005* (2013.01); *H04W 64/006* (2013.01); *H04W 76/023* (2013.01); *H04M 2250/10* (2013.01); *H04M 2250/12* (2013.01); *H04M 2250/64* (2013.01); *H04W 4/025* (2013.01)

(58) Field of Classification Search
CPC ............................... G06K 9/42; H04W 4/008
USPC ........................................ 455/39, 41.1, 41.2
See application file for complete search history.

(56) References Cited

U.S. PATENT DOCUMENTS

| | | |
|---|---|---|
| 8,495,506 B2 | 7/2013 | Cox et al. |
| 8,660,539 B2 | 2/2014 | Khambete et al. |
| 8,700,710 B1 | 4/2014 | Gallagher |
| 8,849,246 B2 | 9/2014 | Daigle |
| 8,886,122 B2 | 11/2014 | Kim et al. |
| 8,909,705 B2 | 12/2014 | Douillet et al. |

(Continued)

*Primary Examiner* — Tuan H Nguyen
(74) *Attorney, Agent, or Firm* — McGuireWoods LLP (57) ABSTRACT

Apparatus and methods are described herein for sorting messages sent and received, for example in a wireless Personal Area Network (PAN), according to whether the receiving device is within a radially defined region of space. The space may be defined by one or more parameters set by the sending device. A wireless PAN may define the range of peer-to-peer transmission and reception of radio waves between at least two wireless devices. Location and orientation information may be transmitted by a communication device and combined with user and/or software defined boundary limits to filter short range wireless messages.

20 Claims, 8 Drawing Sheets

(56) References Cited

U.S. PATENT DOCUMENTS

| | | |
|---|---|---|
| 8,930,238 B2 | 1/2015 | Coffman et al. |
| 2005/0038876 A1 | 2/2005 | Chaudhuri |
| 2007/0067297 A1 | 3/2007 | Kublickis |
| 2007/0093258 A1 | 4/2007 | Steenstra et al. |
| 2007/0190494 A1* | 8/2007 | Rosenberg ............... A63F 13/12 434/11 |
| 2008/0140650 A1 | 6/2008 | Stackpole |
| 2008/0147743 A1 | 6/2008 | Taylor et al. |
| 2009/0157613 A1 | 6/2009 | Strohmenger et al. |
| 2010/0280904 A1 | 11/2010 | Ahuja |
| 2012/0099476 A1 | 4/2012 | Mahaffy et al. |
| 2012/0238285 A1 | 9/2012 | Yariv |
| 2013/0157628 A1* | 6/2013 | Kim ..................... A01K 15/023 455/414.1 |
| 2013/0226628 A1 | 8/2013 | Scher et al. |
| 2014/0115462 A1 | 4/2014 | Reznor et al. |
| 2014/0181521 A1 | 6/2014 | Hemphill et al. |
| 2014/0362728 A1 | 12/2014 | Krochmal et al. |

* cited by examiner

SYSTEM AND METHOD TO SORT MESSAGES EXCHANGED IN A WIRELESS PERSONAL AREA NETWORK ACCORDING TO RELATIVE ORIENTATIONS AND POSITIONS OF SENDING AND RECEIVING DEVICES

CROSS REFERENCE TO PRIOR APPLICATIONS

This application is a continuation application claiming benefit of U.S. patent application Ser. No. 14/093,992, filed with the United States Patent and Trademark Office on Dec. 2, 2013, which claims priority under 35 U.S.C. §119(e) to U.S. Provisional Patent Application No. 61/732,297, filed Dec. 1, 2012, titled "A SYSTEM AND METHOD TO SORT MESSAGES EXCHANGED IN A WIRELESS PERSONAL AREA NETWORK ACCORDING TO THE RELATIVE ORIENTATIONS AND POSITIONS OF THE SENDING AND RECEIVING DEVICES." The disclosure of the foregoing patent applications are hereby expressly incorporated herein by reference in their entirety.

FIELD

The present disclosure relates generally to wireless communication, and more particularly to peer-to-peer wireless communication.

BACKGROUND

Wireless mobile device protocols currently allow two or more devices to communicate in a peer-to-peer fashion within a short range. In order to target which device to receive a message, current systems use identification protocols, simultaneous accelerometer events, distances between devices, and the like. However, such techniques do not allow a user to target their communication and/or other transmissions to particular devices.

SUMMARY

A method for targeted transmission of a communication is described herein. The method may include receiving an event to initiate transmission of a communication; determining one or more spread angles and one or more transmission range constants; determining current orientation of the communication device based on one or more parameters supplied by onboard location and orientation determining components; and transmitting the determined spread angles, transmission range constants, and orientation data, along with the communication, to one or more devices within range of an internal radio.

In accordance with some aspects of the disclosure, the one or more spread angles may comprise a maximum horizontal spread angle and a maximum vertical spread angle, wherein the maximum horizontal spread angle includes a fixed angle set by a user or an application.

In accordance with some aspects of the disclosure, the one or more transmission range constants may comprise a first constant representing a minimum distance from a transmitting device and a second constant representing a maximum distance from the transmitting device.

In accordance with some aspects of the disclosure, the one or more parameters may comprise at least one of GPS coordinates, gyro readings, magnetometer readings, and accelerometer readings.

A method for receiving and processing a communication is also described herein. The method may include receiving, at a receiving device, a data transmission, the data transmission comprising a message and a plurality of parameters associated with a transmitting device; determining a current GPS location of the receiving device and a current time upon receipt of the data transmission; computing one or more directional vectors and angles defining a path from the transmitting device to the receiving device; and determining, based on the directional vectors, a classification for the message.

In accordance with some aspects of the disclosure, the plurality of parameters may comprise one or more of the following: one or more spread angles, one or more transmission range constants, a GPS location of the transmitting device, magnetometer values of the transmitting device, gyro readings of the transmitting device, and accelerometer readings of the transmitting device.

In accordance with some aspects of the disclosure, the one or more spread angles may comprise a maximum horizontal spread angle and a maximum vertical spread angle, and the one or more transmission range constants comprises a minimum distance from the transmitting device and a maximum distance from the transmitting device.

According to some aspects of the disclosure, computing the one or more directional vectors and angles may include determining a bearing vector between the transmitting device and the receiving device; determining projection vectors associated with the bearing vector; and determining angles between the projection vectors.

According to some aspects of the disclosure, determining a classification for the message may include determining whether the length of the bearing vector and the angles between the projection vectors are within a range defined by the one or more spread angles and the one or more transmission range constants; and classifying the message into categories based on whether the bearing vector and the angles between the projection vectors are within the range or outside of the range.

A method for targeted communication of a message from a communication device to a receiving device is also described herein. The method may include receiving an event to initiate transmission of the message from the communication device to the receiving device; determining a spread angle and a transmission range constant for the communication device; determining current orientation of the communication device based on a status parameter; generating orientation data based on the determined current orientation of the communication device; and transmitting the message, the determined spread angle, the transmission range constant, and the orientation data to the receiving device.

In accordance with aspects of the disclosure, the spread angle may comprise a maximum horizontal spread angle or a maximum vertical spread angle. According to some aspects of the disclosure, the maximum horizontal spread angle may include a fixed angle set by a user or an application.

According to some aspects of the disclosure, the transmission range constant may comprise a first constant representing a minimum distance from a transmitting device or a second constant representing a maximum distance from the transmitting device.

According to some aspects of the disclosure, the status parameter may include at least one of a GPS coordinate, a gyro reading, a magnetometer reading, and an accelerometer reading.

According to some aspects of the disclosure, the status parameter may include at least one of time data, gyro data, accelerometer data, magnetometer data, local declination angle data, and GPS data.

According to some aspects of the disclosure, the method may further comprise computing a directional vector and angles from the communication device to the receiving device.

According to some aspects of the disclosure, the method may further comprise determining a bearing vector between the communication device and the receiving device; determining a first pair of projection vectors associated with the bearing vector; and determining a first spread angle between the first pair of projection vectors.

According to some aspects of the disclosure, the method may further comprise determining a second pair of projection vectors associated with the bearing vector; and determining a second spread angle between the second pair of projection vectors.

According to some aspects of the disclosure, the first and second pairs of projection vectors may define a target volume where the receiving device is to be located to receive the message.

BRIEF DESCRIPTION OF THE DRAWINGS

Aspects of the invention will be better understood after reading the following description when considered with the drawings in which.

DESCRIPTION OF THE PREFERRED EMBODIMENTS

Referring now to the drawings in general, it will be understood that the illustrations are for the purpose of describing aspects of the disclosure and are not intended to limit the invention thereto.

The present disclosure is directed to apparatus and methods for sorting messages sent and received, for example, in a wireless Personal Area Network (PAN), according to whether the receiving device is within a radially defined region of space. The space may be defined by one or more parameters set by the sending device. Sorting may allow for applications such as spatially directed and targeted wireless communication without the use of directional radio antennae. A wireless PAN may define the range of peer-to-peer transmission and reception of radio waves between at least two wireless devices. As described in detail herein, location and orientation information may be transmitted by a communication device and combined with user and/or software defined boundary limits to filter short range wireless messages. The message may include an SMS text message, a voice message, an email message, an instruction, data, or any other information or control signal.

Figure 1:
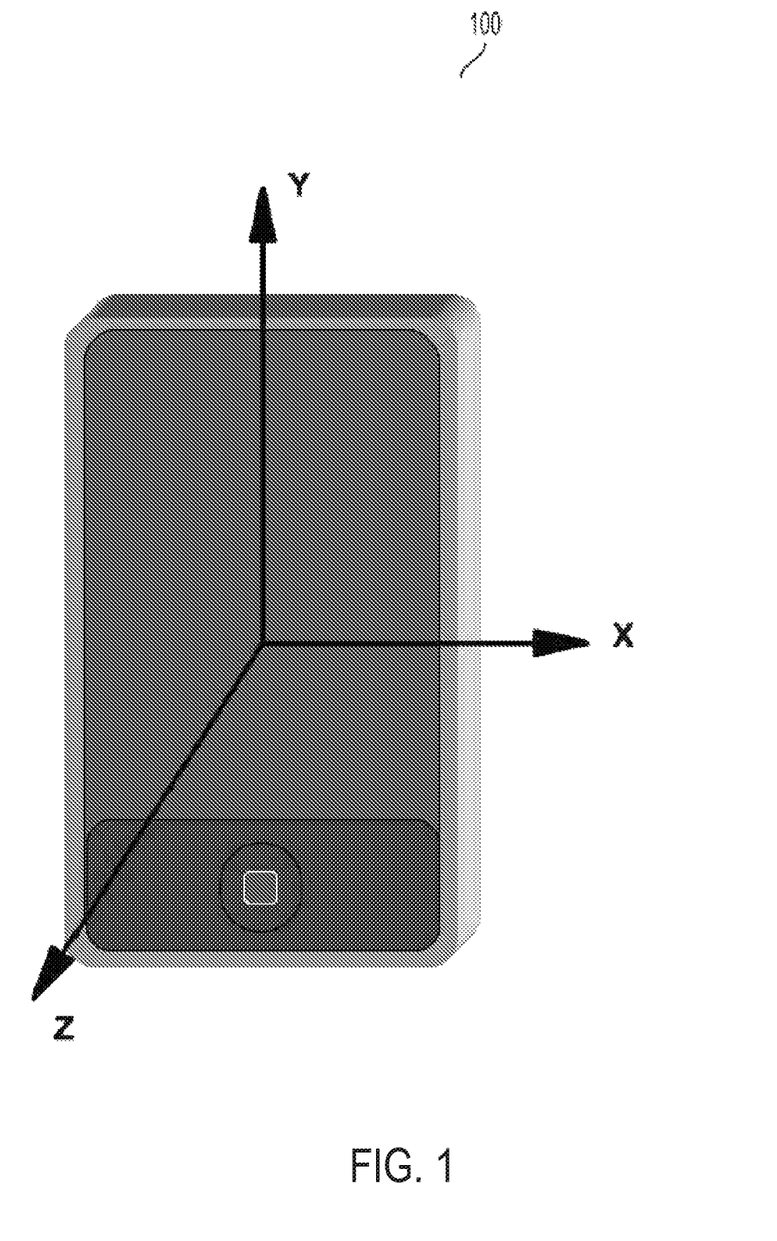
FIG. 1 illustrates an example of a communication device and an associated coordinate system.

FIG. 1 illustrates an example of a communication device 100 that may be used in implementing various aspects of the disclosure. Communication device 100 may be, for example, a mobile phone, smartphone, personal digital assistant (PDA), tablet computer, a game console, and/or any other communication device. Communication device 100 is shown with a coordinate system in order to illustrate various aspects of the disclosure. The coordinate system may be a three-dimension (e.g., X, Y, Z) coordinate system, which may be referred to herein as a body frame. The body frame may be fixed to the body of communication device 100 such that the Z-axis is normal to the face of the device. The body frame may be chosen such that when the Y-axis is parallel with the magnetic field of the earth, a magnetometer (or compass) within communication device 100 reads 0 degrees Magnetic North, and the X-axis is along the angle of 90 degrees east from Magnetic North, and the Z-axis is in the direction of the cross product $u_x \times u_y$, wherein $u_x$ is the unit vector in the X-direction and $u_y$ is the unit vector in the Y-direction.

While not shown in FIG. 1, a fixed local coordinate system (x', y', z') may also be defined, wherein the y' axis is parallel to the direction of Magnetic North, the x' axis is fixed in the direction of magnetic east, and the z' axis is parallel to the ray passing from the center of the earth and locally parallel to the direction of acceleration vector due to gravity. The local coordinate system may be any nearby coordinate system not attached to the rigid body of the device. For example, the local coordinate system may refer to a distance within a few hundred yards of the GPS coordinates of the device. The fixed local coordinate system may be referred to herein as local or local earth coordinates.

Figure 2:
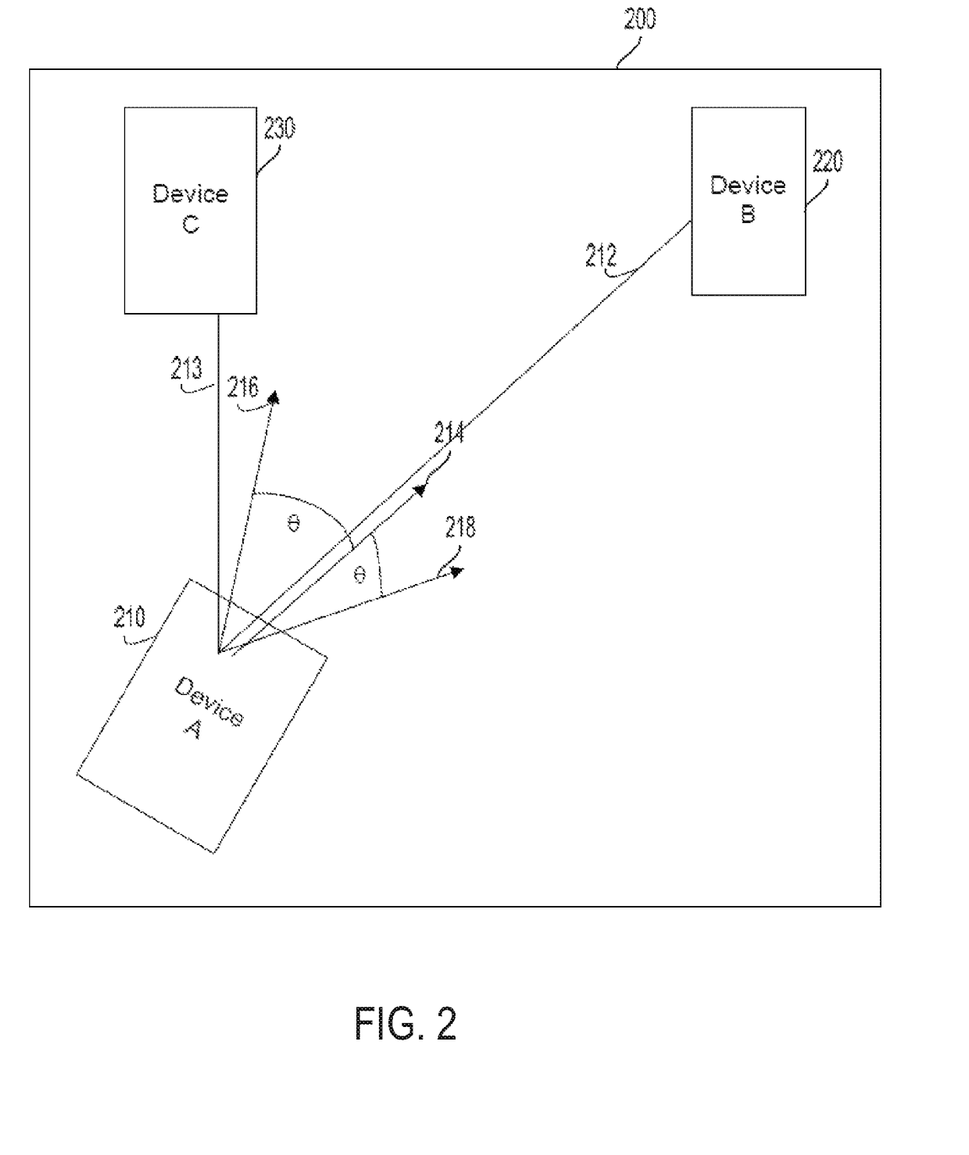
FIG. 2 illustrates an example of a plurality of communication devices communicating in a personal area network.

Turning now to FIG. 2, a plurality of communication devices 210 (Device A), 220 (Device B), and 230 (Device C) are shown within a wireless PAN 200. The devices may be within a few hundred meters of each other. A bearing line 212 is shown representing an imaginary bearing line connecting the GPS location of device 210 to the GPS location of device 220. Bearing line 212 provides a forward sight bearing from device 210 to device 220. The location of each communication device may be defined by latitude, longitude, and elevation GPS coordinates. As such, the location of device 210 may be represented as $(Lat_A, Lon_A, Ele_A)$, device 220 as $(Lat_B, Lon_B, Ele_B)$, and device 230 as $(Lat_C, Lon_C, Ele_C)$. Bearing line 212 defines a bearing vector $B_{AB}$ from device 210 to device 220, wherein $B_{AB}=(Lat_B-Lat_A, Lon_B-Lon_A, Ele_B-Ele_A)$ in local coordinates relative to communication device 210. Similarly, bearing line 213 defines an imaginary bearing line connecting the location of device 210 to the location of device 230 and defines a bearing vector $B_{AC}=(Lat_C-Lat_A, Lon_C-Lon_A, Ele_C-Ele_A)$ in local coordinates relative to communication device 210. While three communication devices are shown in FIG. 2, fewer or more devices may communicate amongst each other.

A unit vector $u_y$ fixed to body frame coordinates in the Y-direction is shown at 214. A heading vector for device 210 may be defined as $Y_A(d)=d*u_y$ for a positive, real number d. The horizontal spread angle in degrees to and away from the direction of $u_y$ is shown as θ. A maximum horizontal spread angle Θ may be defined by a user or an application running on device 210. In addition, the user or application may define constants a and b, which are positive real numbers representing a minimum and maximum distance away from the origin of the body frame, respectively. Horizontal spread vectors relative to the body frame may be defined as $V(r, \theta, 0) = (r*Sin(\theta*k), r*Cos(\theta*k), 0)$, wherein r is a distance from the origin, $k=\pi/180$, $a \le r \le b$ and $-\Theta \le \theta \le \Theta$, shown at 216 and 218.

Figure 3:
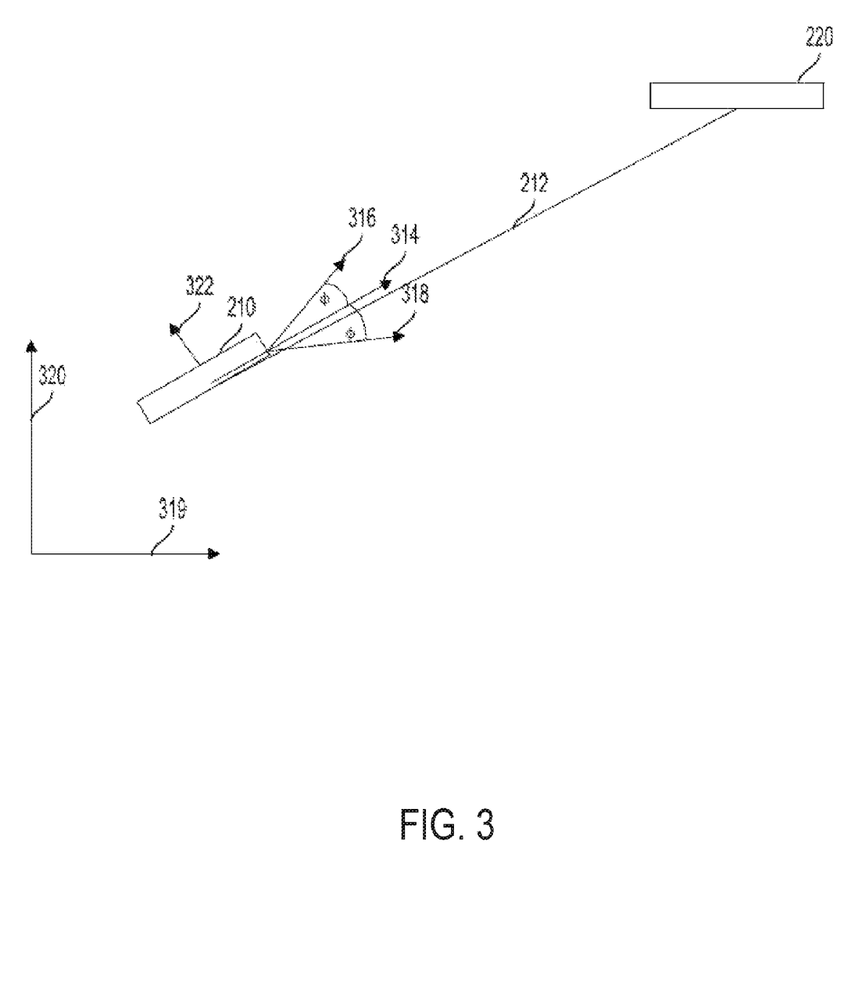
FIG. 3 is another representation of the plurality of communication devices communicating in the personal area network.

FIG. 3 illustrates a side view of the connection between communication device 210 and communication device 220 shown in FIG. 2, wherein communication device 210 has been tilted vertically. The y' and z' axes of the local coordinate system (x', y', z') are shown at 319 and 320, respectively. Vertical spread angles φ are defined with respect to a heading vector 314. Like the horizontal maximum spread angle Θ, a maximum vertical spread angle ψ may also be set by a user or application implementing aspects of this disclosure. The vertical spread vectors relative to the body frame coordinates may be defined as $V(r, 0, \phi) = (0, r*Cos(\phi*k), r*Sin(\phi*k))$, wherein r is a distance from the origin, $k=\pi/180$, $a \le r \le b$ and $-\psi \le \phi \le \psi$, shown at 316 and 318. A unit vector $u_z$ in the z-direction in the body frame of device 210 is shown at 322.

Figure 4:
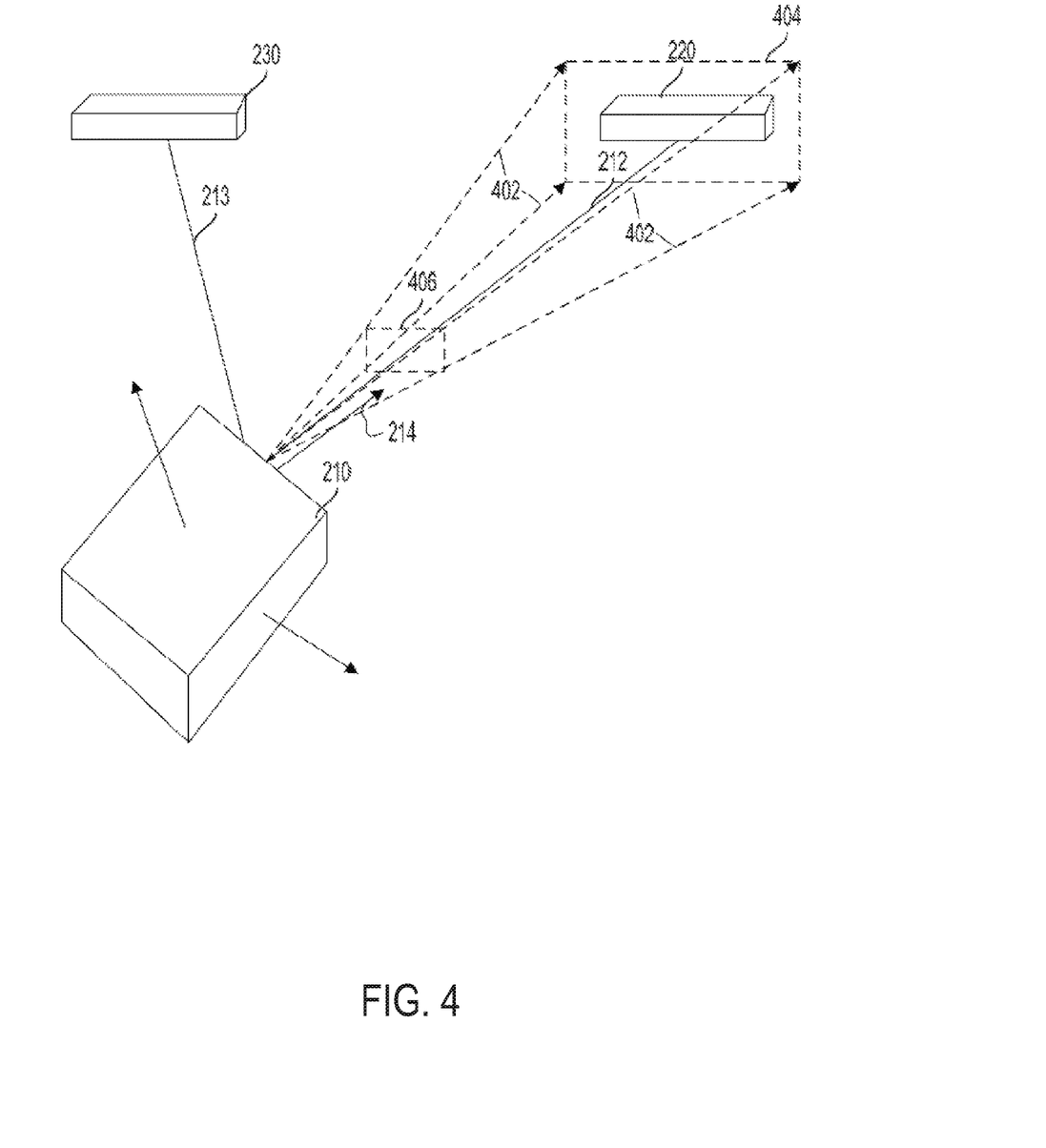
FIG. 4 is yet another representation of the plurality of communication devices communicating in the personal area network.

Referring now to FIG. 4, a three-dimensional perspective view of the system shown in FIGS. 2 and 3 is illustrated. The bearing line 212 between device 210 and 220 and the unit vector 214 are again shown. Four vectors 402 may be defined as follows:

$$V(b,\Theta,\psi) = (b*Sin(\Theta*k)*Cos(\psi*k), b*Cos(\Theta*k)*Cos(\psi*k), b*Sin(\psi*k)),$$

$$V(b,-\Theta,\psi) = (-b*Sin(\Theta*k)*Cos(\psi*k), b*Cos(\Theta*k)*Cos(\psi*k), b*Sin(\psi*k)),$$

$$V(b,\Theta,-\psi) = (b*Sin(\Theta*k)*Cos(\psi*k), b*Cos(\Theta*k)*Cos(\psi*k), -b*Sin(\psi*k)),$$

$$V(b,\Theta,-\psi) = (-b*Sin(\Theta*k)*Cos(\psi*k), b*Cos(\Theta*k)*Cos(\psi*k), -b*Sin(\psi*k)),$$

The above four vectors define a radial volume enclosing the points defined by m, which is defined by the set of points $(r*Sin(\theta*k)*Cos(\phi*k), r*Cos(\theta*k)*Cos(\phi*k), r*Sin(\phi*k))$, such that $a \le r \le b$, $-\Theta \le \theta \le \Theta$, and $-\psi \le \phi \le \psi$. A cross section 404 of this volume, illustrated by a dashed line is shown for a fixed value of r. A second cross section 406 is shown for a smaller value of r. The boundaries set by the vectors may cause the space around and centered at device 210 to be divided into two regions—a region inside the radial volume defined by the vectors and a region outside of this volume. Accordingly, messages received by a receiving communication device can be sorted by whether or not the receiving device is inside or outside of the radial volume at the time of reception.

Figure 5:
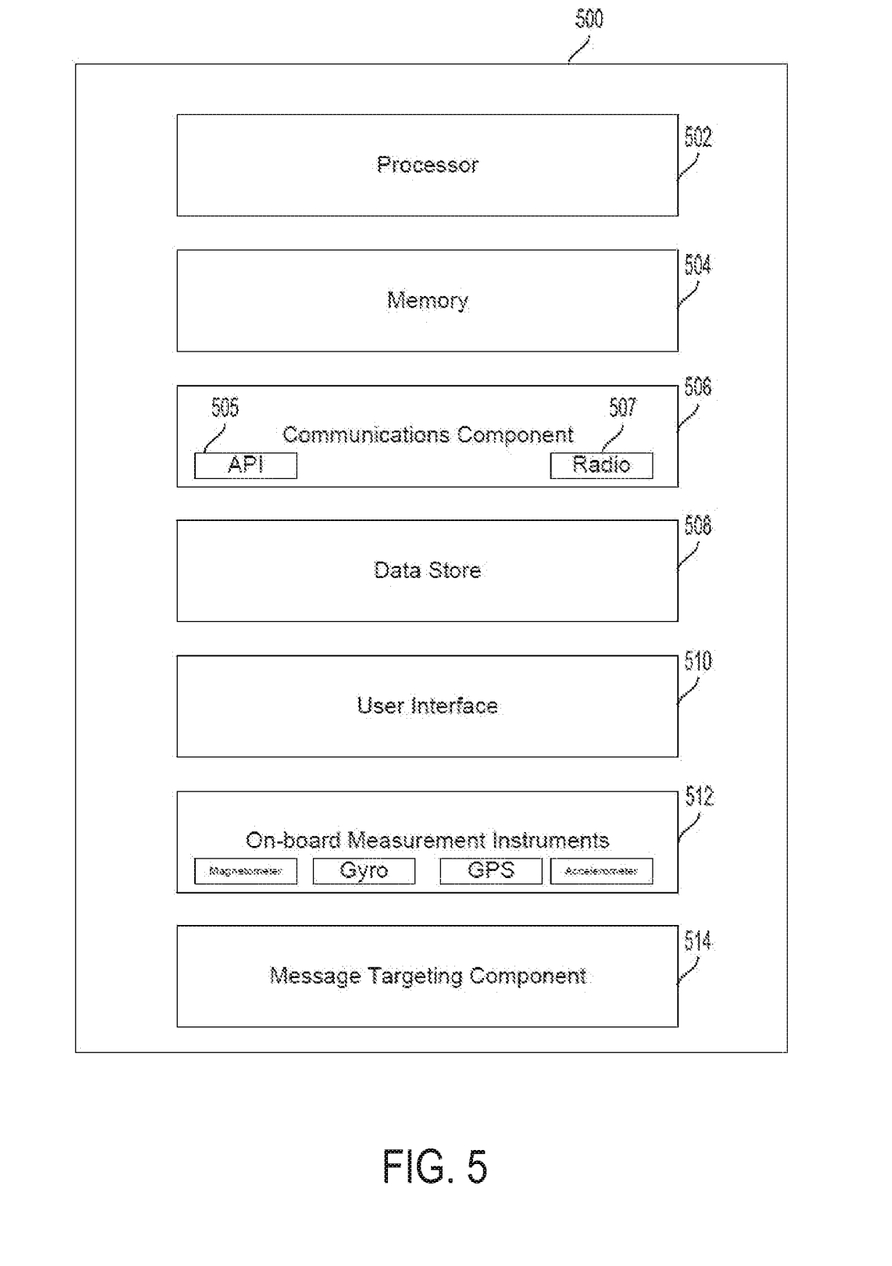
FIG. 5 is a conceptual block diagram illustrating internal components of a communication device.

FIG. 5 is an example of a communication device 500 that may be used to implement aspects of the disclosure. Communication device 500 may include a processor 502 for carrying out processing functions associated with one or more of components and functions described herein. Processor 502 can include a single or multiple set of processors or multi-core processors. Moreover, processor 502 can be implemented as an integrated processing system and/or a distributed processing system.

Communication device 500 further includes a memory 504, such as for storing data and/or local versions of applications being executed by processor 502. Memory 504 can include any type of memory usable by a computer, such as random access memory (RAM), read only memory (ROM), tapes, magnetic discs, optical discs, volatile memory, non-volatile memory, and any combination thereof.

Further, communication device 500 may include a communications component 506 that provides a means for establishing and maintaining communications over one or more communication links with one or more parties utilizing hardware, software, and services as described herein. Communications component 506 may carry communications between components on communication device 500, as well as between the communication device 500 and external devices, such as devices located across a network and/or devices serially or locally connected to communication device 500. For example, communications component 506 may include one or more buses, and may further include transmit chain components and receive chain components associated with a transmitter and receiver, respectively, operable for interfacing with external devices. In some aspects, communications component 506 may include a radio 507 having a preset or adjustable communication range. The radio 507 may include, e.g., a software defined radio (SDR). For example, radio 507 may operate at a maximum range of approximately 300 meters to enable communications devices within the range to communicate with each other. 300 meters is meant only as an example of setting a maximum range. Other values may be used. In accordance with some aspects of the disclosure, communications component 506 may include one or more application programming interfaces (APIs) 505 for accessing processor 502 and/or the data from one or more on-board measuring instruments 512.

Additionally, communication device 500 may further include a data store 508, which may include any suitable combination of hardware and/or software that provides for mass storage of information and programs employed in connection with aspects described herein. The data store 508 may include a database. For example, data store 508 may be a data repository for applications not currently being executed by processor 502. In some aspects, data store 508 may be located within memory 504.

Communication device 500 may additionally include a user interface component 510 operable to receive inputs from a user of communication device 500, may be further operable to generate outputs for presentation to the user. User interface component 510 may include one or more input devices, including but not limited to a keyboard, a number pad, a mouse, a touch-sensitive display, a navigation key, a function key, a microphone, a voice recognition component, a still camera, a video camera, an audio recorder, and/or any other mechanism capable of receiving an input, or any combination thereof. Further, user interface component 510 may include one or more output devices, including but not limited to a display, a speaker, a haptic feedback mechanism, a video projector, a printer, any other mechanism capable of presenting an output, or any combination thereof.

Communication device 500 may include a plurality of on-board measuring instruments 512. For example, on-board measuring instruments may include a magnetometer or compass, a gyroscope (or gyro), a global positioning system (GPS) unit, an accelerometer, and/or other on-board measuring instruments. Communication device 500 may also include message targeting component 514 configured to allow a user to orient a transmitting communication device in such a way as to partition a volume of space into two regions for use in communicating messages. The message targeting component 514 allows messages to be targeted to particular devices.

Figure 6:
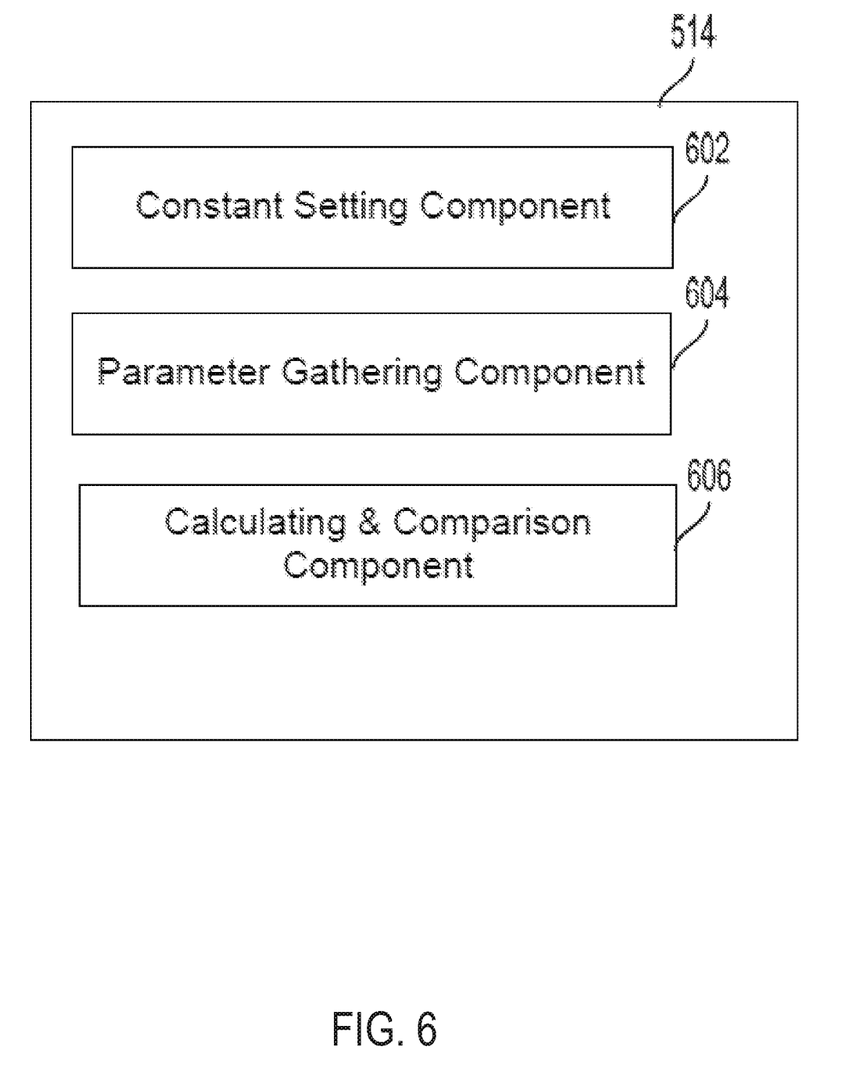
FIG. 6 is a conceptual block diagram illustrating a message targeting component of a communication device.

FIG. 6 illustrates the message targeting component 514 in further detail. Message targeting component 514 may include a targeting constant setting component 602 that enables a user or application(s) to set, for example, a maximum horizontal spread angle $\Theta$, maximum vertical spread angle $\psi$, minimum distance a, and maximum distance b used to set boundaries for receiving a message. Message targeting component 514 may also include a parameter gathering component 604 configured to gather parameters needed to sort a message. For example, for a device transmitting a message, upon initiating a sending event, parameter gathering component 604 may be configured to gather one or more of GPS coordinates, magnetometer values, gyro measurements, accelerometer readings, a stored local declination angle between True North and Magnetic North, the current time, and the predefined spread angles and range constants. In addition, the parameter gathering component 604 may gather any messages to be transmitted. At the receiving end, the parameter gathering component 604 may be configured to gather the GPS coordinates of the receiving device and the current time at the receiving device.

Message targeting component 514 may also include a calculating and comparison component 606. Upon receipt of data, the calculating and comparison component 606 of a receiving device may use its own GPS coordinates and time, in addition to the received data, to calculate one or more vectors. A receiving device, via its calculating and comparison component 606, may calculate a heading vector Y (or the unit vector $u_y$), the vector $u_z$, and the vector $u_x$, where $u_x = u_y \times u_z$. These vectors are local coordinate representations of $u_y$, $u_z$, and $u_x$. Alternatively, the measured data may be used to calculate the Euler angles of the body frame relative to the local frame. Each receiving device may also compute a bearing vector B. The bearing vector B may be used to calculate the projection vectors $P_{x'y'}$ and $P_{y'z'}$ of B onto the planes normal to $u_z$, and $u_x$, respectively. The projection vectors may be determined by $P_{x'y'} = B - (B \cdot u_z)u_z$ and $P_{y'z'} = B - (B \cdot u_x)u_x$. The calculating and comparison component 606 may then calculate $P_{x'y'} \cdot u_y$ and $P_{y'z'} \cdot u_y$, and use the dot product identity to get $P_{x'y'} \cdot u_y = |P_{x'y'}| * |u_y| \cos(\theta_b)$, where $\theta_b$ is the angle subtended between the vectors in the XY plane. As such, $\theta_b = \cos^{-1}(P_{x'y'} \cdot u_y / |P_{x'y'}| * |u_y|)$. Similarly, $\phi_b = \cos^{-1}(P_{x'y'} \cdot u_y / |P_{x'y'}| * |u_y|)$ may be calculated. The calculating and comparison component 606 may compare the calculated values to the heading angles and spread angles to determine whether it lies within those values and sort the messages accordingly. For example, the calculating and comparison component 606 may determine whether the triple (|B|, $\theta_b$, $\phi_b$) satisfies $-\Theta \leq \theta_b \leq \Theta$, $-\psi \leq \phi_b \leq \psi$, and $a \leq |B| \leq b$, where |B| represents the length of the bearing vector. Messages may be separated into those that satisfy the conditions and those that do not, and further processing of the messages may be based on the separation. For example, a device may be configured to decode and/or read a message if the conditions are satisfied or to discard the message if the conditions are not satisfied.

Figure 7:
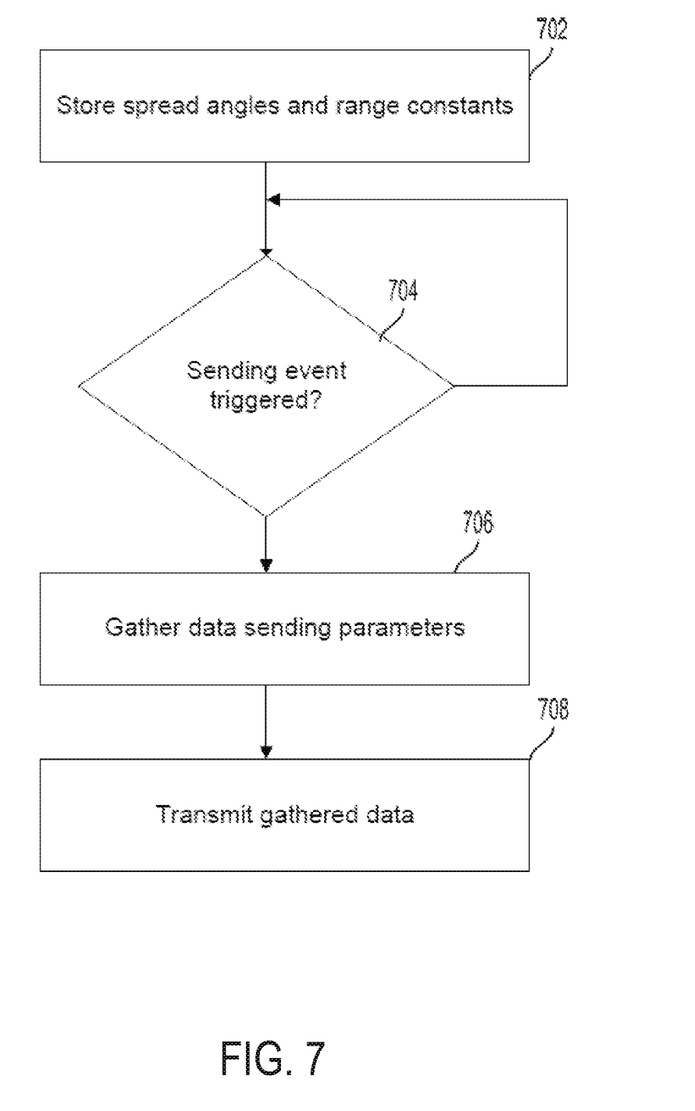
FIG. 7 is a flowchart illustrating an example of a method for transmitting data.

FIG. 7 is a flowchart illustrating an example of a method 700 for transmitting data, in accordance with aspects of the disclosure. As shown at 702, spread angles and range constants are stored. The spread angles and range constants may be predefined by a user or one or more applications running on a communication device, and may be used to define message boundaries. As shown at 704, a transmitting communication device, using its message targeting component 514, may determine whether a sending event has been triggered. For example, the transmitting communication device may detect that the device has been tilted in a particular direction, a transmission button has been selected, the device has been shaken, a spoken command to transmit a message has been issued, etc. Upon receipt of a triggering event, the transmitting device gathers data sending parameters, as shown at 706. For example, the transmitting communication device may gather its GPS coordinates, magnetometer readings, accelerometer readings, gyro readings, and current time. In addition, the transmitting communication device may gather the spread angles and range constants, and any message to be transmitted. As shown at 708, the transmitting device transmits the gathered data to one or more receiving devices.

Figure 8:
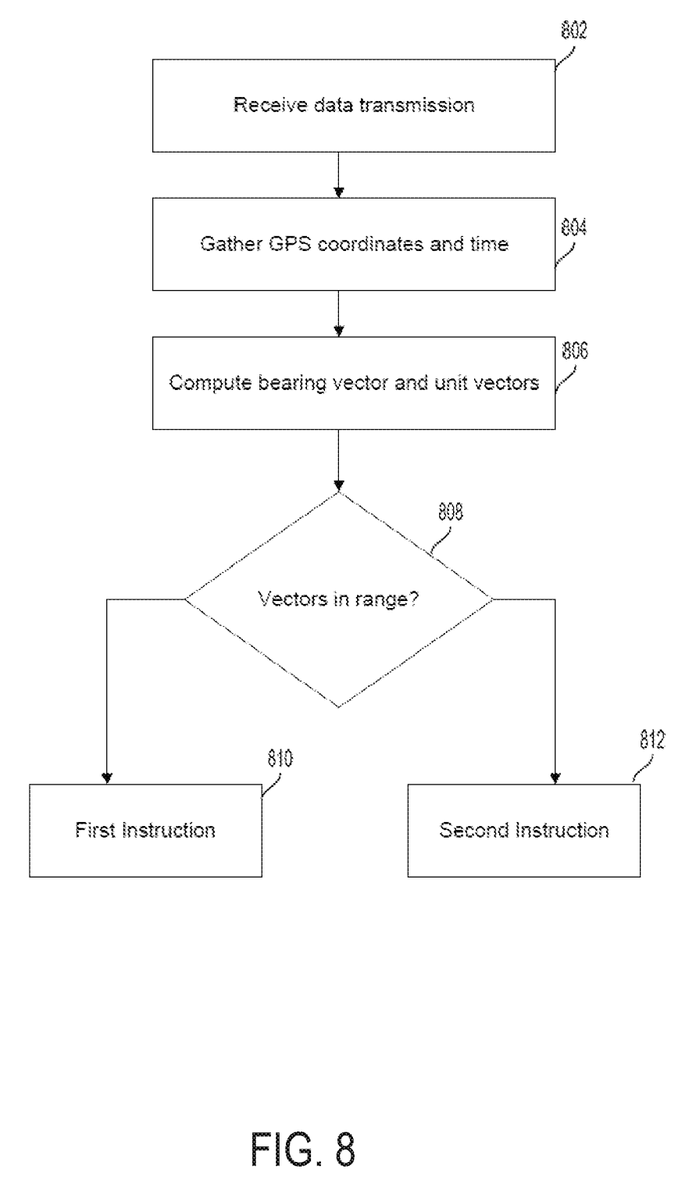
FIG. 8 is a flowchart illustrating an example of a method for receiving data.

Turning now to FIG. 8, an example of a method 800 for receiving and sorting data is illustrated. As shown at 802, a receiving device within range of a transmitting device receives a data transmission. Upon receipt of the data transmission, the receiving device gathers its GPS coordinates and the current time, as shown at 804. As shown at 806, the receiving device computes the bearing vector between itself and the transmitting device and computes the unit vectors. As shown at 808, the receiving device compares the computed values with the heading angles and spread angles transmitted by the transmitting device to determine whether the receiving device lies within the values. If the receiving device falls within the values, the message may be processed in accordance with a first set of instructions, as shown at 810. If the receiving device does not fall within the values, the message may be processed in accordance with a second set of instructions, as shown at 812. For example, the first set of instructions may instruct the device to decode and/or read a message while the second set of instructions may instruct the device to discard the message. Other sets of instructions may be used.

While the aspects of the disclosure have been described in terms of exemplary embodiments, those skilled in the art will recognize that the aspects described herein can be practiced with modifications in the spirit and scope of the appended claims. These examples given above are merely illustrative and are not meant to be an exhaustive list of all possible designs, embodiments, applications or modifications of the described aspects of the disclosure.

A "communication device," as used in this disclosure, means any machine, device, circuit, component, or module, or any system of machines, devices, circuits, components, modules, or the like, which are capable of transmitting and/or receiving data according to one or more instructions, such as, for example, without limitation, a processor, a microprocessor, a central processing unit, a general purpose computer, a super computer, a personal computer, a laptop computer, a palmtop computer, a smart phone, a cellular telephone, a tablet, a web-book, a notebook computer, a desktop computer, a workstation computer, a server, or the like.

While the use or a personal area network (PAN) is described herein, aspects of the disclosure may be implemented via other types of networks. A "network," as used in this disclosure, means any combination of software and/or hardware, including any machine, device, circuit, component, or module, or any system of machines, devices, circuits, components, modules, or the like, which are capable of transporting signals from one location to another location, where the signals may comprise information, instructions, data, and the like. A network may include, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), or the like, any of which may be configured to communicate data via a wireless and/or a wired communication medium.

Communications among devices described in this disclosure may be performed of a communication link. A "communication link," as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like. Techniques for implementing such communications links are known to those of ordinary skilled in the art.

The terms "including," "comprising," "having," and variations thereof, as used in this disclosure, mean "including, but not limited to," unless expressly specified otherwise.

The terms "a," "an," and "the," as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A computer-readable medium may be used to implement the functions described herein. A "computer-readable medium," as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer-readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

What is claimed:

1. A method of targeted transmission of a communication, comprising:
   receiving an event to initiate transmission of a communication;
   determining a plurality of parameters associated with transmitting data; and
   transmitting the determined parameters, along with the communication, to one or more devices within range of an internal radio, the determined parameters being distinct from the transmitted communication.

2. The method of claim 1, wherein the determined parameters comprise one or more of one or more spread angles, one or more transmission range constants, GPS coordinates, magnetometer readings, accelerometer readings, gyro readings, and current time.

3. The method of claim 2, wherein the one or more spread angles comprise a maximum horizontal spread angle and a maximum vertical spread angle.

4. The method of claim 3, wherein the maximum horizontal spread angle includes a fixed angle set by a user or an application.

5. The method of claim 2, wherein the one or more transmission range constants comprise a first constant representing a minimum distance from a transmitting device and a second constant representing a maximum distance from the transmitting device.

6. A method of receiving and processing a communication, comprising:
   receiving, at a receiving device, a data transmission, the data transmission comprising a message and a plurality of parameters associated with a transmitting device, the message being distinct from the plurality of parameters;
   computing one or more directional vectors and angles defining a path from the transmitting device to the receiving device; and
   determining, based on the one or more directional vectors and angles, a classification for the message.

7. The method of claim 6, wherein the plurality of parameters comprise one or more of the following: one or more spread angles, one or more transmission range constants, a GPS location of the transmitting device, magnetometer values of the transmitting device, gyro readings of the transmitting device, accelerometer readings of the transmitting device, and time of the transmission from the transmitting device.

8. The method of claim 7, wherein the one or more spread angles comprises at least one of a maximum horizontal spread angle and a maximum vertical spread angle, and the one or more transmission range constants comprises at least one of a minimum distance from the transmitting device and a maximum distance from the transmitting device.

9. The method of claim 7, wherein computing the one or more directional vectors and angles comprises:

determining a bearing vector between the transmitting device and the receiving device;
determining projection vectors associated with the bearing vector; and
determining angles between the projection vectors.

10. The method of claim 9, wherein determining a classification for the message comprises:
determining whether the length of the bearing vector and the angles between the projection vectors are within a range defined by the one or more spread angles and the one or more transmission range constants; and
classifying the message into categories based on whether the bearing vector and the angles between the projection vectors are within the range or outside of the range.

11. A method of targeted communication of a message from a communication device to a receiving device, the method comprising:
receiving an event to initiate transmission of the message from the communication device to the receiving device;
determining a plurality of parameters associated with transmitting data from the communication device; and
transmitting the message and the determined parameters to the receiving device, the determined parameters being distinct from the transmitted message.

12. The method of claim 11, wherein the determined parameters comprise one or more of one or more spread angles, one or more transmission range constants, GPS coordinates, magnetometer readings, accelerometer readings, gyro readings, and current time.

13. The method of claim 12, wherein the spread angle comprises a maximum horizontal spread angle or a maximum vertical spread angle.

14. The method of claim 13, wherein the maximum horizontal spread angle includes a fixed angle set by a user or an application.

15. The method of claim 12, wherein the transmission range constant comprises a first constant representing a minimum distance from a transmitting device or a second constant representing a maximum distance from the transmitting device.

16. The method of claim 12, wherein the status parameter comprises at least one of a GPS coordinate, a gyro reading, a magnetometer reading, and an accelerometer reading.

17. The method of claim 11, further comprising computing a directional vector and angles from the communication device to the receiving device.

18. The method of claim 11, further comprising:
determining a bearing vector between the communication device and the receiving device;
determining a first pair of projection vectors associated with the bearing vector; and
determining a first spread angle between the first pair of projection vectors.

19. The method of claim 18, further comprising:
determining a second pair of projection vectors associated with the bearing vector; and
determining a second spread angle between the second pair of projection vectors.

20. The method of claim 19, wherein the first and second pairs of projection vectors define a target volume where the receiving device is to be located to receive the message.

* * * * *